No. 831,059. PATENTED SEPT. 18, 1906.
J. C. W. GRETH.
FLUID FEEDING APPARATUS.
APPLICATION FILED AUG. 7, 1905.
2 SHEETS—SHEET 1.
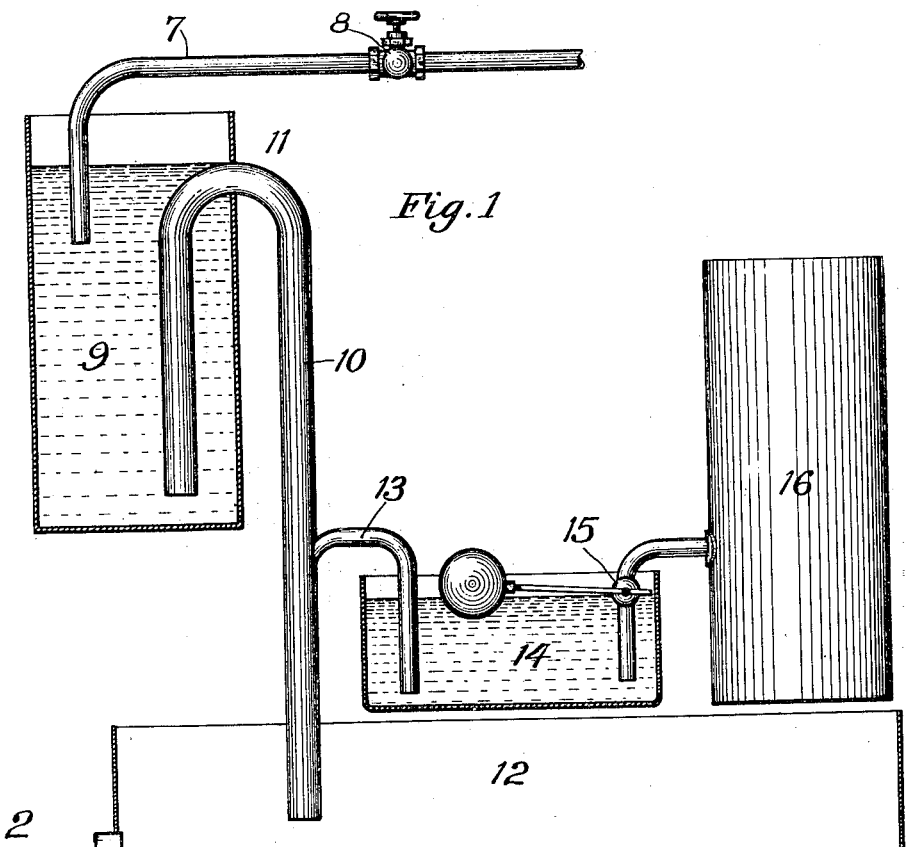
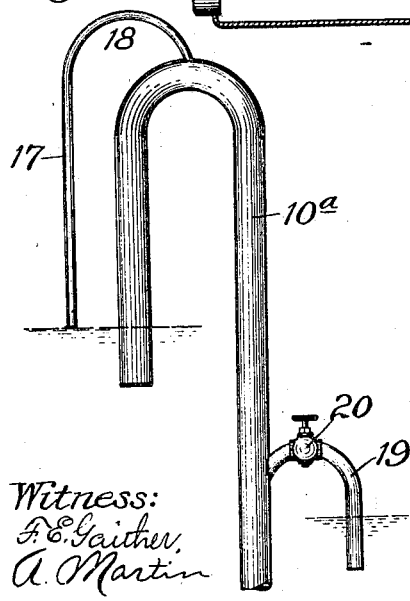
Witness:
F. E. Gaither.
A. Martin
Inventor,
John C. W. Greth
By F. W. H. Clay Atty.

No. 831,059. PATENTED SEPT. 18, 1906.
J. C. W. GRETH.
FLUID FEEDING APPARATUS.
APPLICATION FILED AUG. 7, 1905.

2 SHEETS—SHEET 2.

Witness:
F. E. Gaither.
A. Martin

Inventor:
John C. W. Greth,
By F. W. H. Clay, Atty.

UNITED STATES PATENT OFFICE.

JOHN C. W. GRETH, OF PITTSBURG, PENNSYLVANIA.

FLUID-FEEDING APPARATUS.

No. 831,059.  Specification of Letters Patent.  Patented Sept. 18, 1906.

Application filed August 7, 1905. Serial No. 272,998.

*To all whom it may concern:*

Be it known that I, JOHN C. W. GRETH, a citizen of the United States, residing at Pittsburg, in the State of Pennsylvania, have invented a certain new and useful Fluid-Feeding Apparatus, of which the following is a specification.

My invention relates to means for proportionately feeding several liquids simultaneously—as, for example, in water-purifying apparatus where a chemical solution used is fed in definite proportion to the volume of raw water taken into the apparatus; and it refers particularly to a system of automatic siphons for this purpose.

While the invention is equally applicable to many other purposes, I have herein illustrated its use as adapted to water-purifying apparatus, and in such instance the primary object is to cause a definite quantity of the liquid reagent to be fed into and mixed with a definite quantity of raw water at a definite rate and both of such feeding actions to begin and cease automatically.

A further object is to provide for easy and accurate regulation of the amount of chemical reagent supplied and the proportions of the liquids and avoid the use of valves.

A still further object is to arrange a main siphon to automatically feed the raw water and several supplementary siphons for the chemicals which themselves operate or are operated by the main siphon, the said operations being either governed by a measured amount of water to be emptied or by a measured amount of the chemical solution, as may be desired.

These and other advantages to hereinafter appear are attained by the apparatus illustrated as applied to water-purifying apparatus in the accompanying drawings, wherein—

Figure 4:
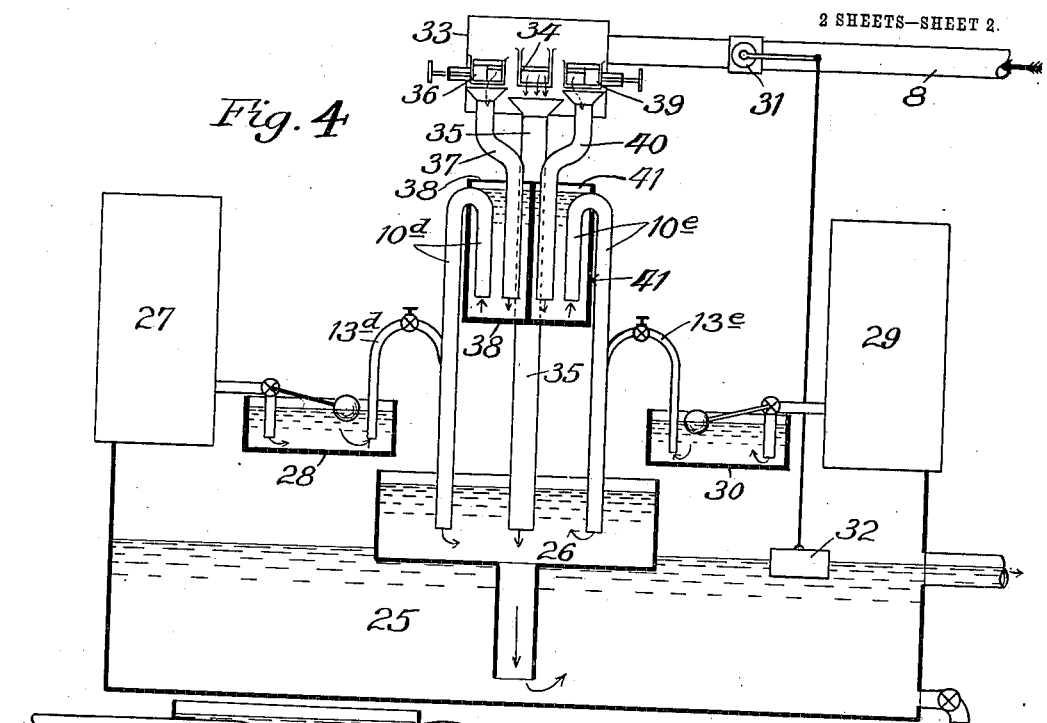
Figure 5:
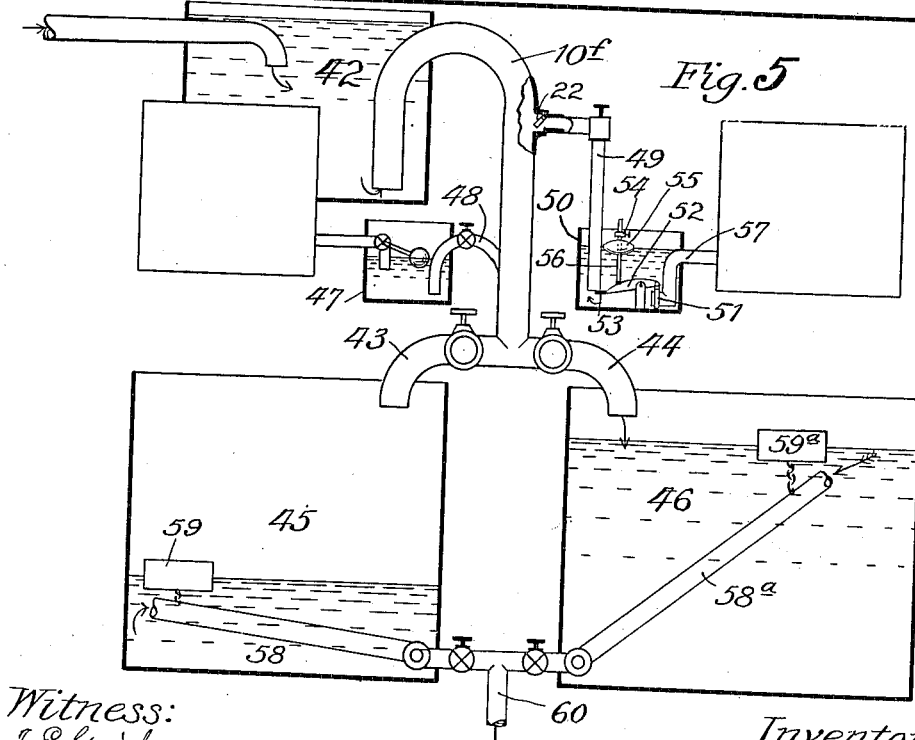

Figure 1 is a diagram of the simple siphons and vessels for operating them shown in section. Fig. 2 is a diagram showing a modified means for breaking the siphons when the water-tank is nearly emptied. Fig. 3 is a diagram showing still another form, in which the main siphon is broken by the supplementary siphon. Fig. 4 is an outline side elevation of part of a complete water-purifying plant, showing the use of my invention to feed from a twin set of tanks and siphons governing the flow by the volume of a water-tank. Fig. 5 is an outline side elevation and partial section of another form of apparatus in which the siphons are governed by the volume of one of the solution-tanks.

In water-purifying apparatus as herein shown for illustration it is desirable to lead the water to be purified into a mixing-tank and add from time to time or constantly a definite quantity of some chemical reagent, such as lime-hydrate or soda, or both, in order to precipitate the impurities, after which the water flows into a settling-tank or filter. It has been customary to approximately measure the amount of the chemical by complicated valve and float arrangements, and has been very difficult or impossible to gage it accurately. I overcome these difficulties by the use of proportionate siphons for feeding. Thus in Fig. 1 is shown a feed which is not only accurate but entirely automatic. A supply-pipe 7, which may be varied in capacity by the valve 8, empties into a receiver 9, which is emptied as soon as filled by a siphon 10, leading the raw water into a mixing-tank 12. It starts operation when the water-level reaches the apex 11 and will be broken and cease to operate when the level has fallen below the mouth of the short leg, admitting air therein. The receiver 9 is of course emptied more rapidly than the inflow through the supply-pipe 7, which is smaller than 10. At the same time as the raw water flows in the chemical solution is fed to it in definite quantity by means of a supplementary siphon 13, which is of a pipe considerably smaller than the siphon 10 and draws from the small tank 14, which may be in the meanwhile kept at a constant level or head by means of an automatic float-valve 15, controlling the pipe through which the milk of lime is fed from a mixing-tank 16. It will be seen that this siphon is started when siphon 10 begins to flow by reason of the relief of atmospheric pressure on the adjoining end of the small siphon 13. As the flow continues the fluid in the tank 14 will be forced through the siphon 13, and after being once started it will flow at a constant rate until the water-level in the tank 9 drops below the lower end of the siphon 10 and admits air to break the siphon 10, also reaching the siphon 13 and breaking this, so as to stop the flow of chemical at the same time as the cessation of raw-water flow. The mixed lime and water may then be conducted from tank 12 to a reaction or settling tank, as may be desired, the rest of the apparatus not being essential to illustrate my invention.

In some cases, especially when the main outlet-siphon for the water-tank is composed of small piping where capillary action has some effect, it is desirable to provide special means for breaking the siphon quickly at the proper time, and for this purpose the arrangement of Fig. 2 is sometimes used. In this the main siphon $10^a$ is tapped at its apex by a small pipe 17, whose bend 18 is above the apex of the siphon $10^a$ and whose lower end is above the lower end of the inner leg. The supplementary siphon 19 may be arranged as before, and it may be provided with the valve 20, by which the amount and proportion of the chemical solution may be easily regulated. In this device it will be seen when the water-level in the tank falls below the mouth of the small pipe 17 air will be admitted at the apex of the main siphon $10^a$ and stop the flow immediately in the whole apparatus, both legs discharging at once, and not depending on the expansion of the entrapped air, as usual in siphons.

The supplementary-siphon pipe 21 may be tapped into the main siphon above the lower level of the inner short leg if it be smaller than the main siphon, and in order to prevent any flow inward through the small siphon at the beginning of the operation I provide a check-valve or small flap-valve 22, as in Fig. 5, which will allow the water to flow in forward direction in the supplementary siphon, but not backward. In the above forms the siphons are broken by exhausting the water-supply.

When desired, the breaking of both siphons may be accomplished by the exhaustion of a fixed amount of the reaction liquid in the chemical-tank, and in Fig. 3 I have shown a convenient form of the apparatus for this purpose. The main siphon $10^c$ having started to flow will continue as long as there is any solution in the feeding-tank 14; but when this is emptied air will enter into the supplementary siphon 24 and by this means will not only break the small siphon, but will also break the large siphon $10^c$, since the pipe 24 taps it above the mouth of its shorter leg, as will be understood. In this instance the supplementary siphon 24 when much the smaller may tap the larger siphon at any point between its apex and the mouth of its inner leg. In the apparatus of Fig. 2 the smaller siphon may be made of any desired size, and, if desired, may be as large as the main siphon.

In Fig. 4 I have shown a very compact form of water-purifying apparatus designed to use my invention for feeding the chemicals. The diagram represents in section a large settling-tank 25, inside of which is placed a mixing vessel 26, which empties into tank 25, and upon the top of this may be placed a soda-mixing tank 27 and a feeding-tank 28 therefor and also a lime-mixing tank 29 and a feeding-tank 30 therefor. The raw water will enter through the feed-pipe 8, as before, and its valve 31 is regulated in the amount of its opening by means of attachment to the float 32 in the settling-tank 25, so as to cause the flow in the feed-pipe to be the same as that of the flow out of the settling-tank 25, which is led away for use or conveniently to a filter, as may be desired. The pipe 8 empties into a weir-box 33, which is provided with a large central weir 34, which may be of fixed size and empties into a pipe 35, leading directly into the mixing vessel 26. The weir-box 33 also has a smaller regulable weir 36, which feeds the raw water through the pipe 37 into the left-hand compartment 38 of the receiver. This is provided with a main siphon $10^d$ to empty it into the mixing vessel 26, and at the same time it carries in the necessary amount of soda solution through the supplementary siphon $13^d$, which may be in any of the forms heretofore described. Exactly similarly, on the other side, a regulable weir 39 by pipe 40 empties into the compartment 41 of the receiver and is in turn emptied by the main siphon $10^e$, feeding at the same time the lime solution from tank 30 by means of the supplementary siphon $13^e$. In this apparatus the siphons are governed by the charge of water or the relative capacities of the weirs and the siphons $10^d$ and $10^e$. In Fig. 5 another form of such apparatus is shown, especially adapted for intermittent systems in which the feed-pipe is small and empties into a small receiving-tank 42, which is emptied by means of a siphon $10^f$, which is much larger than the feed-pipe. The long leg of the siphon $10^f$ has two branches 43 and 44. The branch 43 leads to the mixing-tank 45, and the other branch 44 leads into the mixing-tank 46. Both of these are emptied by flexible pipes 58 and $58^a$, whose mouths are kept near the surface by floats 59 $59^a$, and they empty into a filter or storage tank through pipe 60. The branches 43 and 44 are provided with valves, as are pipes 58 and $58^a$, and thus the tanks 45 and 46 may be used in alternation. As the flow in siphon $10^f$ continues the soda solution may be drawn in through siphon 48, which has a valve, so that the amount is easily regulated and the supply-tank 47 is kept at a constant level. On the other side the lime-solution tank 50 is provided with a siphon 49 to empty it automatically and has also means to empty an exact measured amount of the chemical and then break all of the siphons and stop the flow of water. The lime-feeding pipe 57 has at its lower end a sliding valve 51, operated by a lever 52, whose end 53 is flattened and partly covers the mouth of the siphon-tube 49. A rod 56 is attached to lever 52 and has an adjustable button 54 to limit the range of the sliding float 55 on the rod. The rising of the float to its limit closes valve 51. As the solution is fed out through pipe 49 the float comes to rest on lever 52; but its weight is not quite enough to overcome the friction of valve 51 to open it plus the suction on the end of lever 52 under the pipe; but when the tank 50 is emptied and air enters pipe 49, relieving the water-suction, the lever 52 falls and opens valve 51 to refill the tank 50. The siphon 49 meanwhile has stopped and also broken siphons 10$^f$ and 48. It will be seen that by this means an exact measure of the chemical solution may be emptied each time and with it an exact measure of the raw water and of the other chemical solution, and the frequency of the discharges to replenish the settling or mixing tanks may be accurately governed by adjusting the inflow at the pipe-feeding tank 42. In the case of the apparatus of Fig. 4 the amount of raw water discharged at each time is constant and the amount of the chemical solutions may be governed accordingly, while the frequency of discharge is regulated by the valve 31 and the relation of the amounts fed through pipes 35 and through the receivers 28 and 41 are governed by the size of opening of the weirs 36 and 39. All the actions in each case are entirely automatic. The various advantages of the devices will readily occur to those familiar with the art.

Having thus described my invention and illustrated its use, what I claim as new, and desire to secure by Letters Patent, is the following:

1. The combination with several vessels, of a compound siphon having a common long leg and several short legs forming siphons in the respective vessels whereby the flow from each vessel is in fixed proportion, and the junctions of the siphons being at such height that stopping the flow through one of them stops the others.

2. In apparatus for feeding liquids in proportion from several vessels, a main siphon for one vessel and a branch siphon thereon extending into another vessel and joining the main siphon above the liquid-level in the latter vessel, substantially as and for the purpose described.

3. A compound siphon having a single long leg and several branching short legs communicating therewith below the apex, and means to feed a predetermined quantity to each and stop their flow by breaking one of the siphons at its mouth.

4. A main siphon and a supplementary siphon tapping it on the long leg above the level of the mouth of the short leg and a check-valve at the inlet from the supplementary siphon.

5. A feeding device comprising in combination with a supply-tank of definite quantity of fluid and a feeding-tank of fluid at constant level below the supply-level, a main siphon in the supply-tank and a siphon in the feeding-tank joining the main siphon on its long leg, whereby the definite quantity flowing through the main siphon automatically feeds a definite quantity from the feeding-tank through said supplementary siphon, and flow is stopped by the main siphon.

6. A supply-tank and means to fill it at a certain rate, an automatic siphon to empty the tank at a more rapid rate, a feed-tank and means to keep fluid therein at constant level and a supplementary feeding-siphon therein communicating with the long leg of the main siphon, whereby the feed is started and stopped automatically by the main siphon and is definite in amount and rate of flow.

7. In fluid-feeding apparatus the combination with a supply-tank and adjustable means to introduce a definite quantity of water therein at a definite rate, of a main siphon arranged therein to empty it at a more rapid rate, a chemical-solution tank and a valved feeding-siphon arranged to take from the same and said siphon communicating with the main siphon on its long leg, whereby the automatic starting and stopping of the main siphon automatically starts and stops the supplementary siphon and the water and solution are fed in definite adjustable quantities at definite rates.

8. The combination with two liquid-containing vessels of a siphon in each, adapted to empty it, and said siphons communicating at a point above the level in one of the vessels, whereby the higher siphon may start the lower and may itself be broken by stoppage of the flow in the lower siphon.

9. The combination with a water-supply tank and a chemical-solution tank of a main siphon emptying said supply-tank and a connected supplementary siphon to feed from the solution-tank, and one of the said feed-siphons adapted to break the other siphon at a definite time.

10. The combination with two vessels for liquid, of a main siphon in one of them adapted to draw out a definite quantity and then break by exposure of the short leg and a supplementary siphon in the other vessel tapping the long leg of the main siphon and adapted to be started and stopped thereby.

11. In combination, a water-supply vessel and a chemical-supply vessel, means in the latter to keep a constant level, a siphon therein, a siphon in the water vessel adapted to empty it and then break on its inside leg, and the siphon from the chemical vessel communicating with its long leg, whereby the flow of chemical is started and stopped by the definite flow from the water vessel.

12. The combination of two vessels, a siphon adapted to empty the one vessel and a communicating siphon in the other adapted to be started and stopped by the flow from the first vessel through its emptying siphon, whereby definite proportional quantities of liquid are fed from the two vessels automatically.

In testimony whereof I have hereunto signed my name in the presence of the two subscribed witnesses.

JOHN C. W. GRETH.

Witnesses:
F. E. GAITHER,
F. W. H. CLAY.